United States Patent
Munier et al.

(10) Patent No.: US 9,422,061 B2
(45) Date of Patent: Aug. 23, 2016

(54) DEVICE FOR CONTROLLING THE POWER OF AN ENGINE AND FOR CONTROLLING A THRUST REVERSER DEVICE

(71) Applicant: SAGEM DEFENSE SECURITE, Boulogne-Billancourt (FR)

(72) Inventors: François Munier, Boulogne-Billancourt (FR); Hafid Elabellaoui, Boulogne-Billancourt (FR); Philippe Savignac, Boulogne-Billancourt (FR); Severin Viennot, Boulogne-Billancourt (FR); Thierry Cartry, Boulogne-Billancourt (FR)

(73) Assignee: Sagem Defense Securite, Boulogne-Billancourt (FR)

( * ) Notice: Subject to any disclaimer, the term of this patent is extended or adjusted under 35 U.S.C. 154(b) by 0 days.

(21) Appl. No.: 14/889,624

(22) PCT Filed: May 2, 2014

(86) PCT No.: PCT/FR2014/051048
§ 371 (c)(1),
(2) Date: Nov. 6, 2015

(87) PCT Pub. No.: WO2014/181059
PCT Pub. Date: Nov. 13, 2014

(65) Prior Publication Data
US 2016/0083103 A1    Mar. 24, 2016

(30) Foreign Application Priority Data
May 6, 2013   (FR) ...................... 13 54140

(51) Int. Cl.
*B64D 31/04*   (2006.01)
*F02K 1/76*   (2006.01)
*B64D 33/04*   (2006.01)

(52) U.S. Cl.
CPC ................ *B64D 31/04* (2013.01); *B64D 33/04* (2013.01); *F02K 1/763* (2013.01)

(58) Field of Classification Search
CPC ........... F02K 1/76; F02K 1/763; F02K 1/766; B64D 31/04; B64D 33/04
See application file for complete search history.

(56) References Cited

U.S. PATENT DOCUMENTS

| 3,279,184 A | 10/1966 | Felix et al. |
| 3,572,155 A | 3/1971 | Banks |
| 2014/0061389 A1* | 3/2014 | Elabellaoui ............ B64D 31/04 244/224 |
| 2014/0190304 A1* | 7/2014 | Elabellaoui ............ B64D 31/04 74/483 R |

FOREIGN PATENT DOCUMENTS

| FR | 2 950 861 A1 | 4/2011 |
| FR | 2 950 862 A1 | 4/2011 |
| WO | WO 2011/042146 A1 | 4/2011 |
| WO | WO 2011/042147 A1 | 4/2011 |

OTHER PUBLICATIONS

PCT International Search Report mid Written Opinion for PCT/FR2014/051048, mailed Jul. 2, 2014, 10 pages.
English translation of PCT International Search Report for PCT/FR2014/051048, mailed Jul. 2, 2014, 3 pgs.
English translation of Written Opinion for PCT/FR2014/051048, mailed Jul. 2, 2014, 5 pages.
Results of Earlier Search for FR 1354140, Feb. 24. 2014., 2 pages.

* cited by examiner

*Primary Examiner* — Arun Goyal
(74) *Attorney, Agent, or Firm* — Patterson Thuente Pedersen, P.A.

(57) ABSTRACT

A device for controlling the power of an engine and of a thrust reverser device. The invention includes a frame on which a primary cam track is formed, a thrust lever hinged to the frame, a thrust reverser lever hinged to the thrust lever, a bearing face arranged on the thrust reverser lever, a locking lever hinged to the thrust lever and comprising a first end and a second end. When the thrust lever has been pivoted by a predefined angle relative to the idle position of same, actuation of the thrust reverser lever is blocked, both by the second end of the locking lever pressing against the bearing face of the thrust reverser lever, and by the first end of the locking lever pressing against the primary cam track.

16 Claims, 6 Drawing Sheets

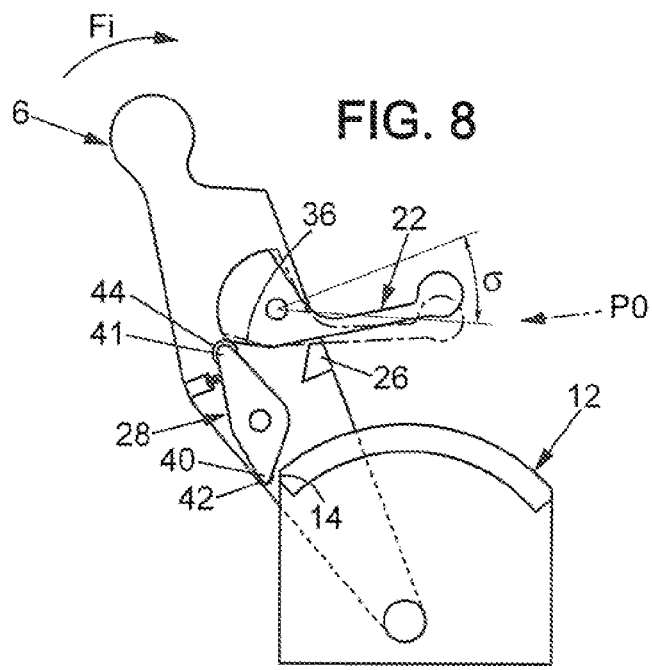
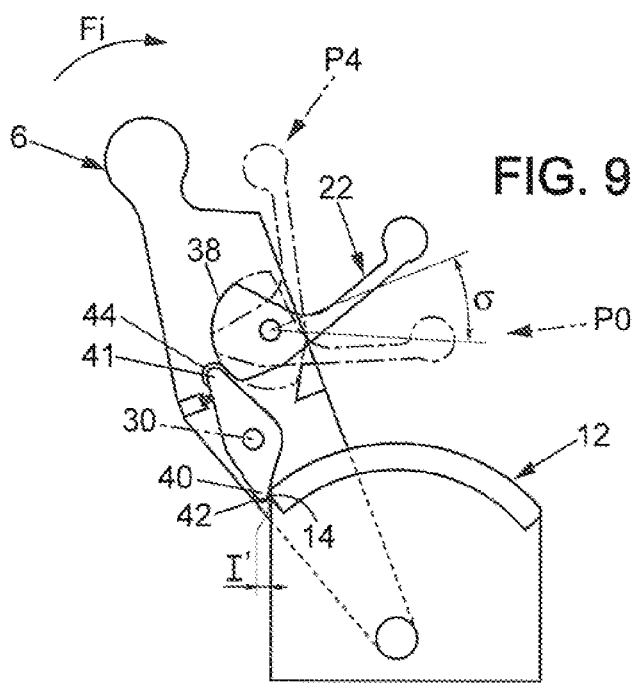

DEVICE FOR CONTROLLING THE POWER OF AN ENGINE AND FOR CONTROLLING A THRUST REVERSER DEVICE

RELATED APPLICATIONS

The present application is a National Phase entry of PCT Application No. PCT/FR2014/051048, filed May 2, 2014, which claims priority from FR Patent Application No. 13 54150, filed May 6, 2013, said applications being hereby incorporated by reference herein in their entirety.

FIELD OF THE INVENTION

The invention relates to a device for controlling the power of an engine and for controlling a thrust reverser device for aircraft.

BACKGROUND OF THE INVENTION

Such a control device may, for example, be used in an aircraft having a jet engine or turboprop engine.

This control device can control both the engine power and a thrust reverser device. A thrust reverser device is a device that directs the engine thrust in the forward direction in order to decelerate the aircraft and reduce braking distance during landing.

This control device generally comprises a lever for adjusting the power, commonly called a throttle lever or thrust lever, and a thrust reverser lever, both of which are adapted to pivot between an idle position and a fully actuated position in order to rotate a control member. Sensors, cooperating with the control member, are adapted to transmit control commands to a control unit.

The most recent control devices can provide a function in which, when one lever is positioned within a certain angular range of its actuation path, any simultaneous manipulation of the other lever is blocked by a mechanical type of prevention.

For example, in patent application WO 2011/042147, this prevention is achieved by sliding a finger simultaneously into a first cam track formed in the structure and into a second cam track formed on a part integral to the control member of the device; the finger being arranged in an elongated groove formed at the end of the thrust lever and being connected by a rod to the thrust reverser lever. When manipulating the thrust reverser lever and the thrust lever, the finger slides in the grooves of the first and second cam tracks and thereby causes the thumbwheel to rotate.

Such a control device has good mechanical strength. However, it can induce high mechanical stress at certain functional points, requiring the overdesigning of certain parts. This overdesigning is critical because of the location of these parts in the kinematic chain. Such overdesigning can also increase the weight of the control device. Such a control device is also complex to implement when high precision is desired in the angle of rotation of a lever from which point the other lever is prevented from rotating.

Also known, for example from patent application WO 2011/042146, is an "engaging roller" system which, in the same system, further implements a second function of automatically returning a lever to its idle position if it is positioned before a predefined angle of its actuation path and if the other lever is actuated.

Such an "engaging roller" type of system allows providing two functions with one subassembly, which lowers the number of parts, the bulk, the weight, and the cost. However, such a system has a lower mechanical strength and achieves the desired levels of locking precision only through the use of an adjustment system that is difficult to manage because of assembly tolerances and machining precisions.

SUMMARY OF THE INVENTION

The object of the present invention is to provide a device for controlling the power of an engine and for controlling a thrust reverser device for aircraft, which performs the two functions mentioned above, namely, the mechanical locking of one lever relative to the other over an angular range of its driving stroke, and the automatic return of one lever over another angular range of its driving stroke during actuation of the other lever, while having good mechanical strength, and reduced weight, bulk, and cost.

To this end, the invention relates to a device for controlling an engine and for controlling a thrust reverser device for aircraft, the control device comprising:
  a frame,
  a thrust lever hinged to the frame on a hinge axis,
  a thrust reverser lever hinged to the thrust lever on a hinge axis, the thrust lever and the thrust reverser lever being adapted to be pivoted from an idle position to a fully actuated position, characterized in that it further comprises:
  a bearing face arranged on a portion of the thrust reverser lever,
  a primary cam track provided on the frame, and
  a locking lever comprising a pivot axis hinged on the thrust lever, a first end and a second end arranged one on either side of the pivot axis,
  and in that, when the thrust lever has been pivoted by an angle greater than or equal to a predetermined angle defined relative to its idle position, actuation of the thrust reverser lever is blocked, both by the second end of the locking lever pressing against the bearing face of the thrust, reverser lever and by the first end of the locking lever pressing against the primary cam track.

Advantageously, the control device has great structural strength when a locked lever (thrust or thrust reverser) is stressed by an external force. In particular, because of its upstream position in the kinematic chain, when a force is applied to the thrust reverser lever when it is locked, the locking lever and the frame are subjected to compression which improves the structural resistance of the control device.

Advantageously, the locking precision is increased.

Advantageously, the thrust lever is single-axis, without relay nor intermediate cam or gears which are costly in terms of position accuracy, reliability, and the number of parts and therefore the weight. The control device no longer has a connecting rod system which can result in rod alignment problems.

Advantageously, the kinematic chain is continuous both in the thrust mode of operation and in the thrust reverser mode of operation. Advantageously, the control member is a controlling thumbwheel which then has no dead zone.

Advantageously, the thrust reverser lever is constantly biased toward a bottom stop such that movements due to vibration are limited. The ergonomics and safety of the control device are also improved by the "automatic" pressing of the thrust reverser lever against a bottom stop.

This control device can advantageously be installed with an "engaging roller" system to provided redundancy of the locking system with no shared parts.

According to some particular embodiments, the control device includes one or more of the following characteristics: it comprises:

a stop face provided on the frame, said stop face extending as an extension of the primary cam track, and a secondary cam track formed on a portion of the thrust reverser lever and extending as an extension of the bearing face; said secondary cam track forming a defined angle with the bearing face of the thrust reverser lever; said defined angle being defined in a plane perpendicular to the hinge axis of the thrust reverser lever;

wherein, when the thrust lever is positioned before said predetermined angle, the first end of the locking lever is arranged facing and at a first predetermined distance from the stop face to enable actuation of the thrust reverser lever by pivoting the locking lever counterclockwise; the second end of the locking lever sliding on the bearing face to return the thrust lever to its idle position before reaching the secondary cam track;

wherein when the thrust reverser lever has been pivoted by an angle greater than or equal to a predefined angle defined relative to its idle position, actuation of the thrust lever is blocked by the first end of the locking lever pressing against the stop face of the frame and by the second end of the locking lever pressing against the secondary cam track;

wherein said defined angle is chosen so that when the thrust reverser lever is positioned before said predefined angle, the second end is arranged on the bearing face and actuation of the thrust lever pivots the thrust reverser lever clockwise toward its idle position;

wherein the bearing face has an end connected to the secondary cam track and an opposite end, the hinge axis of the thrust reverser lever being positioned at a distance from the bearing face of the thrust reverser lever; and wherein said distance increases between said opposite end and the end connected to the secondary cam track;

which comprises:
  a stop fixed to the thrust lever; the thrust reverser lever resting on an upper face of said stop when the thrust reverser lever is in the idle position;
  a biasing device adapted to generate torque on the thrust reverser lever in order to return the thrust reverser lever toward said stop;

wherein the biasing device comprises a projection fixed to the thrust lever and a biasing spring fixed to said projection;

wherein the stop comprises a side face against which the thrust reverser lever is adapted to abut when the thrust reverser lever is in the fully actuated position;

wherein the first and/or second ends of the locking lever comprise respective first and/or second rollers pivotally mounted on an axis parallel to said hinge axis;

which comprises a controlling thumbwheel adapted to rotate about the hinge axis of the thrust lever in a predetermined direction in order to control the engine power and wherein the thrust lever directly drives said controlling thumbwheel;

which comprises a connecting rod connecting the thrust reverser lever to said controlling thumbwheel and wherein the thrust reverser lever causes rotation, via the connecting rod, of the controlling thumbwheel in a direction that is the reverse of the predetermined direction, in order to control the thrust reverser device of the aircraft;

wherein the secondary cam track has a substantially rounded shape of which the center is the hinge axis of the thrust reverser lever, such that the force required to drive the thrust reverser lever is substantially constant;

wherein the primary cam track has a substantially rounded shape of which the center is the center of rotation of the thrust lever, so as to maintain a constant working clearance between the primary cam track and the first end of the locking lever, upon actuation of the thrust lever;

wherein the defined angle is between 91° and 179°; and wherein the primary cam track forms an angle with the stop face of the frame in a plane perpendicular to the hinge axis of the thrust lever; said angle being between 91° and 179°.

BRIEF DESCRIPTION OF THE FIGURES

The invention will be better understood by reading the following description, given solely as an example and with reference to the Figures in which:

FIG. 8 is a view of a portion of the side face illustrated in FIG. 1, with the thrust reverser lever positioned before a predetermined angle $\sigma$; and FIG. 9 is a view similar to the view illustrated in FIG. 1, with the thrust reverser lever positioned after the predetermined angle $\sigma$.

DETAILED DESCRIPTION OF THE FIGURES

Figure 1:
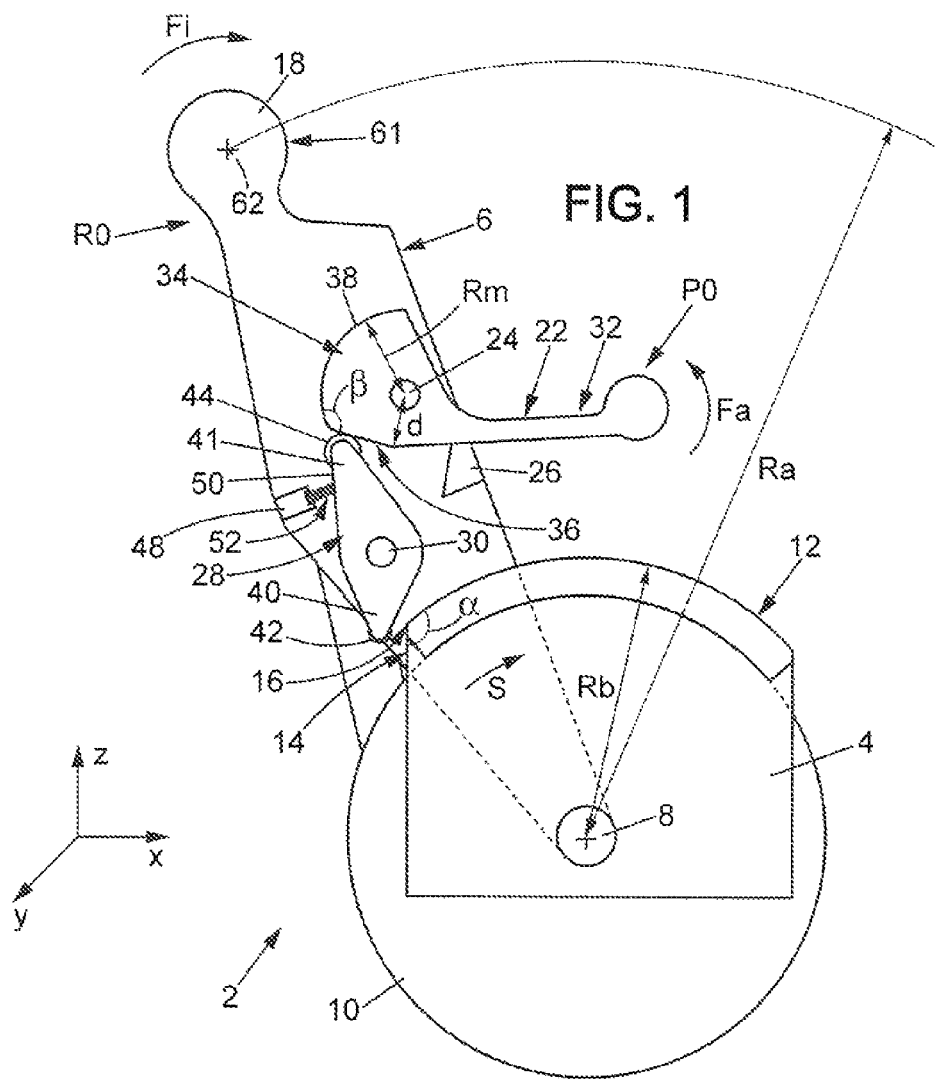
FIG. 1 is a view of a side face of the control device of the invention.

The description of the control device is made with reference to an orthogonal system (x, y, z), shown in FIG. 1, Terms such as "upper" and "lower" are defined relative to the position of the control device illustrated in FIG. 1.

Figure 2:
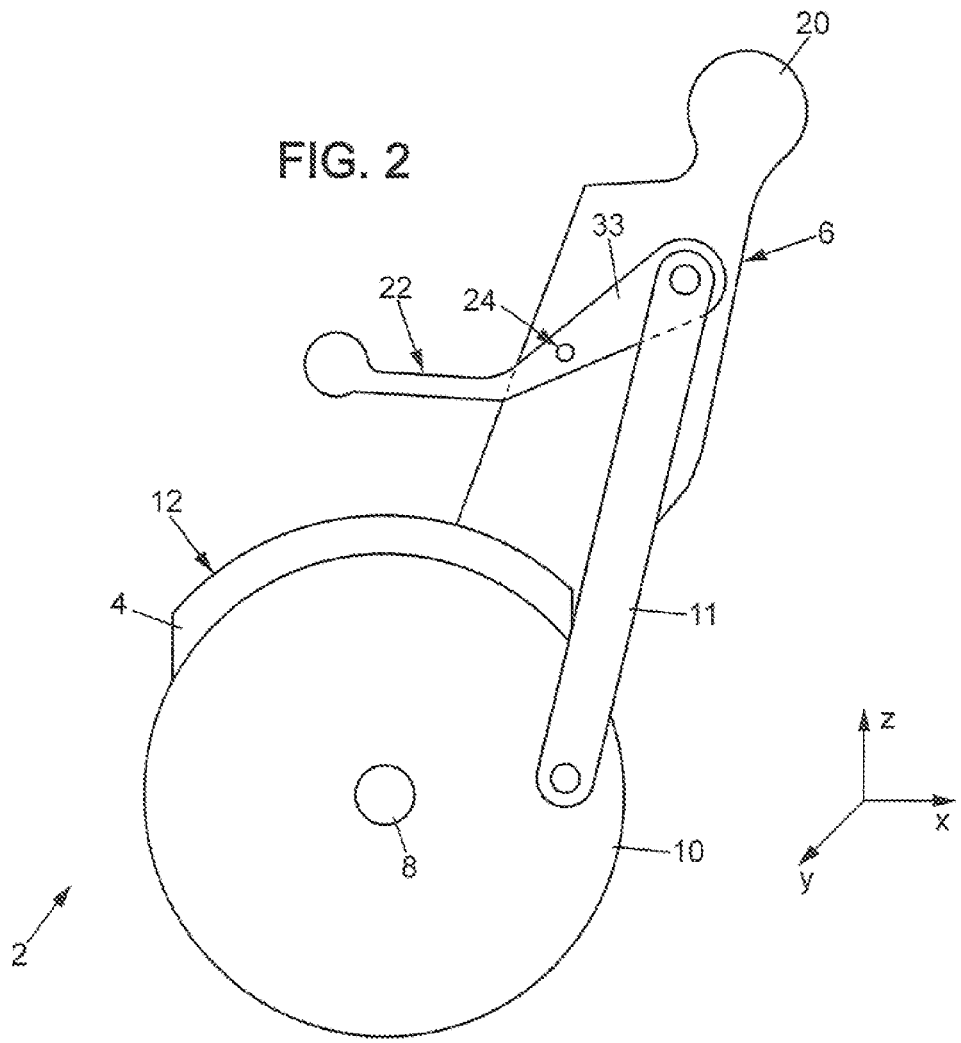
FIG. 2 is a view of the side face opposite the face shown in FIG. 1.
Figure 3:
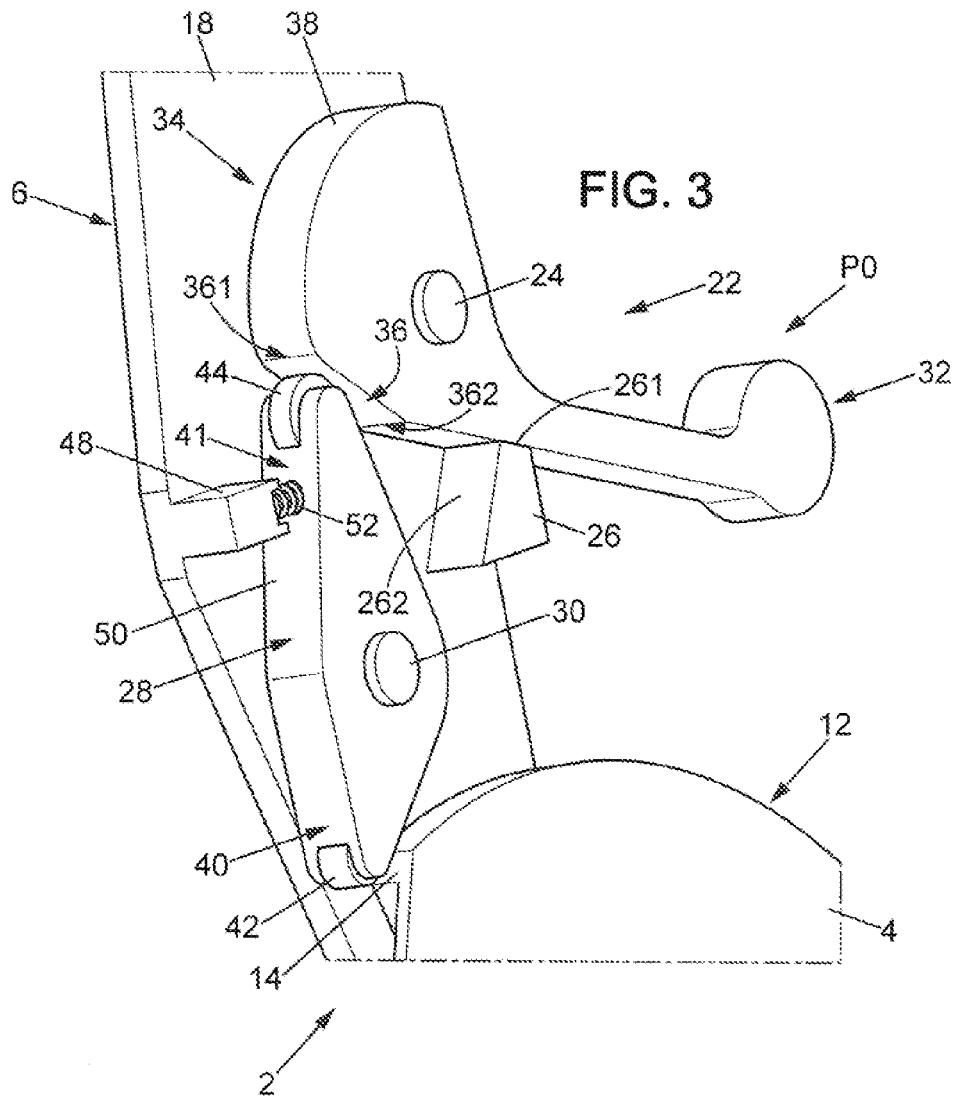
FIG. 3 is a perspective view of a portion of the control device according to the invention.

Referring to FIGS. 1, 2 and 3, the control device 2 according to the invention comprises a frame 4, a thrust lever 6 hinged to the frame 4 on a hinge axis 8, a controlling thumbwheel 10 hinged to the frame 4, and a connecting rod 11 connecting the thrust lever 6 to the controlling thumbwheel 10.

The thrust lever 6 comprises a spherical gripping end 61 having a center 62. The center of rotation of the hinge axis 8 of the thrust lever 6 is separated from the center 62 of the spherical gripping end 61 by a distance Ra.

The frame 4 has the shape of a flange which lies in plane (x, z). A cam track, hereafter referred to as the primary cam track 12, is arranged on the upper edge of this flange. This primary cam track 12 has a rounded shape whose center is the center of the hinge axis 8 of the thrust lever and whose radius Rb is, for example, between 1/7 of distance Ra and 7/10 of distance Ra.

The frame 4 comprises a flat stop face 14 provided on the front face of the flange. The stop face 14 lies in plane (y, z) as an extension of one end 16 of the primary cam track 12. The stop face 14 forms, with the primary cam track 12, a defined angle in plane (x, z). This angle $\alpha$ is, for example, between 91° and 179°.

The thrust lever 6 controls the power of the engine by directly rotating the controlling thumbwheel 10 in a predetermined direction S. Said lever is adapted to pivot about a hinge axis 8, along an actuation path between an idle position R0 and a maximum power position. The idle position is illustrated in FIGS. 1 and 2. It is located on the stop face 14 side. When the thrust lever 6 is in the idle position Ro, the engine does not provide any power. When the thrust lever is in the maximum driving position, the maximum power is generated by the engine. The thrust lever 6 has a side face 18 shown in FIG. 1 and an opposite side face 20 shown in FIG. 2.

The controlling thumbwheel 10 is adapted to rotate about an axis of rotation which extends coaxially with the hinge axis 8 of the thrust lever 6, in order to control an engine power control device and a thrust reverser device, both not shown. Position sensors, also not shown, are attached in line with the controlling thumbwheel 10. These position sensors are electrically connected to a unit for controlling the power control device and the thrust reverser device.

The control device 2 comprises, on side face 18 of the thrust lever, a thrust reverser lever 22 hinged on the thrust lever 6 about a hinge axis 24, a stop 26 for the thrust reverser lever, and a locking lever 28 hinged on the thrust lever 6 about a pivot axis 30. Hinge axis 24 and pivot axis 30 are parallel to hinge axis 8 of the thrust lever 6.

The thrust reverser lever 22 is adapted to control the movement of the doors or propellers of the thrust reverser device. It also controls the power output, with no action by the thrust lever 6. It is adapted to pivot along an actuation path between an idle position P0 shown in FIG. 1 and a maximum drive position P4 shown in FIG. 9. In the idle position, the doors of the thrust reverser device form an extension of the propelling nozzle. Away from this idle position, the doors are fully deployed; or in the case of a turboprop engine, the pitch of the propeller is reversed. In the maximum driving position P4, the engine power is the maximum allowable in reverse thrust mode, and in the case of a turboprop engine, the pitch is reversed to the maximum possible. When the thrust reverser lever is in its idle position P0, it extends substantially horizontally against an upper face of the stop 26, as shown in FIGS. 1 and 2.

The thrust reverser lever 22 has a yoke or U-shape. It includes a gripping arm 32, a first drive arm 33, and a second drive arm 34 hinged on the thrust lever about the hinge axis 24.

The connecting rod 11 is hinged on one end of drive arm 33 of the thrust reverser lever and on a peripheral portion of a side face of the controlling thumbwheel 10. Upon actuation of the thrust reverser lever 22 in the actuation direction Fa, the connecting rod 11 is adapted to drive the controlling thumbwheel 10 to rotate in a direction that is the reverse of the predetermined direction S.

A portion of the second drive arm 34 of the thrust reverser lever is provided with a bearing face 36 and a cam track, referred to as the secondary cam track 38, which extends as an extension of the bearing face 36. The bearing face 36 has an end 361 connected to the secondary cam track 38 and an opposite end 362 connected to the gripping arm 32. The bearing face 36 is flat. It forms a ramp which is slightly inclined relative to the gripping arm 32. The distance d defined between the hinge axis 24 of the thrust reverser lever and the bearing face 36 of the thrust reverser lever increases between the end 362 connected to the gripping arm 32 and the end 361 connected to the secondary cam track 38. Starting at the secondary cam track 38, the distance d between the hinge axis 24 and the bearing face 36 is constant; the secondary cam track 38 is concentric with the hinge axis 24.

In other words, the bearing face 36 forms an angle $\beta$ with the secondary cam track 38 at their connection. The angle $\beta$ is chosen such that when the thrust reverser lever 22 is positioned before a predefined angle $\sigma$, the second end 41 is on the bearing face 36 and actuation of the thrust lever 6 causes the thrust reverser lever 22 to pivot clockwise toward its idle position P0. This angle $\beta$ is, for example, between 91° and 179°.

The secondary cam track 38 has a rounded shape whose center is the center of the hinge axis 24 of the thrust reverser lever 22 and whose radius Rm is, for example, between 5/100 of distance Ra and 14/50 of distance Ra.

The ratio between the radius Rm of the curve formed by the secondary cam track 38 and the minimum distance dm separating the hinge axis 24 of the thrust reverser lever from the orthogonal projection of the hinge axis 24 onto the plane defined by the bearing face 36, is between 4/100 of distance Ra and 27/100 of distance Ra.

The stop 26 is fixed to the side face 18 of the thrust lever so that it extends perpendicularly thereto. It has an upper face 261 which lies substantially in plane (x, y) and on which the gripping arm 32 of the thrust reverser lever rests when the thrust reverser lever is in the idle position, and a side face 262 slightly inclined relative to plane (y, z) against which the bearing face 36 of the thrust reverser lever abuts when the thrust reverser lever is in the maximum driving position.

The locking lever 28 has a first free end 40 and a second free end 41, one on each side of the pivot axis 30. The first 40 and second 41 ends are respectively provided with first 42 and second 44 rollers pivoting about an axis parallel to the hinge axis 8 of the thrust lever.

The control device 2 further comprises a biasing device adapted to generate torque on the thrust reverser lever 22 such that said lever pivots clockwise towards the stop 26.

When the thrust reverser lever 22 is placed in the idle position P0 against the stop 26, the biasing device advantageously maintains the thrust reverser lever 22 in this position. This increases the safety of the control device. It ensures that the thrust reverser lever 22 cannot accidentally be engaged by the vibrations caused, for example, when passing through an area of turbulence.

As long as the thrust reverser lever 22 has pivoted in an actuating direction Fa by an angle less than a predefined angle $\sigma$, the biasing device is adapted to push the thrust reverser lever 22 towards its idle position P0. The predefined angle $\sigma$ is defined relative to the angle of the thrust reverser lever 22 when the latter is in the idle position P0 on the stop 26.

In the illustrated embodiment, the biasing device comprises a projection 48 extending perpendicularly to the side face 18 and a biasing spring 52 extending between one face of said projection 48 and a portion 50 of the locking lever. The biasing spring 52 is adapted to urge the second roller 44 of the locking lever against the bearing face 36 of the thrust reverser lever. The biasing spring 52 as well as the incline of the bearing face 36 bring the thrust reverser lever 22 to the idle position against the upper face of the stop 26.

Alternatively, the biasing device comprises a torsion spring fixed to the thrust lever 6 and either to the locking lever 28 or to the gripping arm 32.

According to another variant, the biasing spring 52 is replaced by a leaf spring.

When operating in thrust mode, as the pilot moves the thrust lever 6 in the actuating direction Fi from its idle position R0 toward its fully actuated position while the thrust reverser lever is in the idle position P0, the first roller 42 slides along the primary cam track 12. The biasing spring 52 urges the second roller 44 against the bearing face 36. The pressure exerted by the second roller 44 on the bearing face 36 presses the thrust reverser lever 22, which is in the idle position P0, against the stop 26. The first roller 42 does not interfere with movement of the thrust lever 6.

Figure 4:
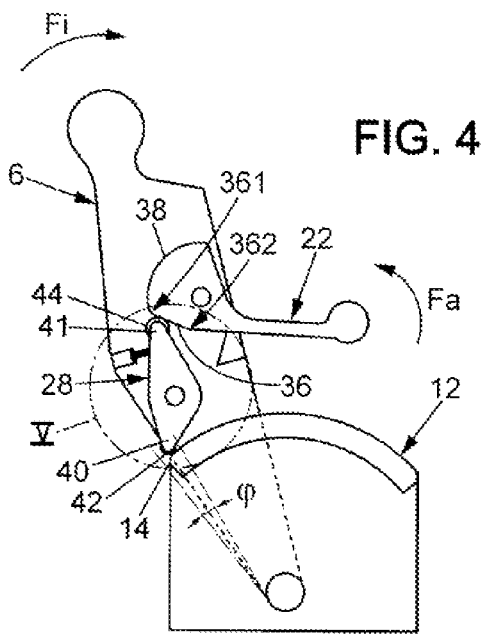
FIG. 4 is a view of a portion of the side face illustrated in FIG. 1, with the thrust lever positioned before a predefined angle.

Referring to FIG. 4, when the thrust lever 6 is positioned before a predetermined angle $\phi$, the axis of the first roller 42 of the locking lever is arranged facing the edge/corner defined between the end 16 of the primary cam track 12 and the stop face 14; the predetermined angle ϕ being defined relative to the angle of the thrust lever 6 when said lever is in the idle position. The first end 40 of the locking lever is then arranged at a first predetermined distance I from the stop face 14.

Figure 6:
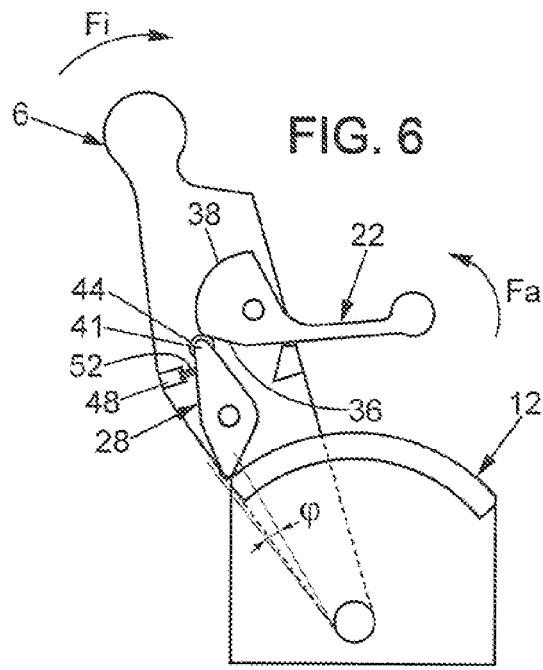
FIG. 6 is a view of a portion of the side face illustrated in FIG. 4, with the thrust reverser lever actuated.

This configuration allows cooperation between the first roller 42 and the stop face 14 when the locking lever 28 generates pressure on the first roller 42, which applies force able to return the thrust lever 6 to its idle position. Thus, referring to FIG. 6, as one engages the thrust reverser lever 22 in an actuation direction Fa, the bearing face 36 applies force on the second roller 44 which tends to accentuate the counterclockwise pivoting of the locking lever 28, accentuating the action of the first roller 42 on the stop face 14 and thus the return of the thrust lever 6 to the idle position. When said idle position is reached by the thrust lever, the second roller 44 is then in line with the secondary cam track 38, which stops the counterclockwise rotation of the locking lever 28, and therefore any force on the thrust reverser lever 22. Thus, even with a slight engagement of the thrust lever 6 at an angle less than or equal to the predetermined angle ϕ, the thrust reverser lever 22 can be engaged by the pilot in an actuation direction Fa subject to exerting sufficient force on the thrust reverser lever 22 to bring the thrust lever 6 to its idle position and to compress the biasing spring 52.

Thus, the control device 2 according to the invention allows engaging the thrust reverser lever 22 when the thrust lever 6 is itself already engaged by an angle less than the predetermined angle ϕ. And in this case the engagement of the thrust reverser lever 22 automatically returns the thrust lever 6 to its idle position.

Figure 7:
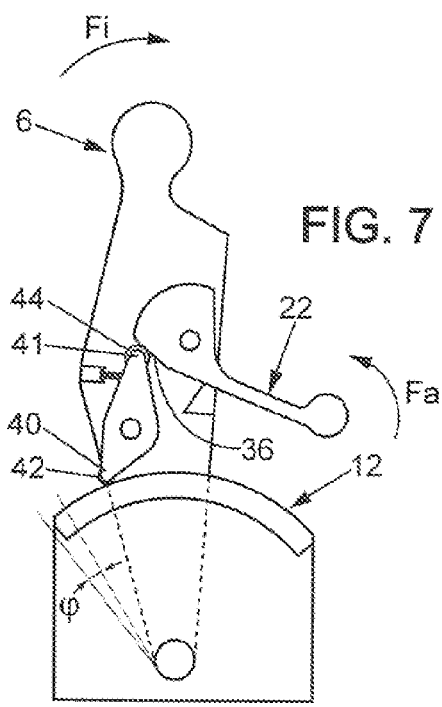
FIG. 7 is a view similar to the view shown in FIG. 6, with the thrust lever positioned after the predefined angle $\phi$.

Referring to FIG. 7, in case of attempted actuation of the thrust reverser lever 22 while the thrust lever 6 is engaged by an angle greater than the predetermined angle ϕ, rotation of the thrust reverser lever 22 in an actuation direction Fa is blocked by the second roller 44 of the locking lever pressing against the bearing face 36 of the thrust reverser lever and by the first roller 42 of the locking lever pressing against the primary cam track 12.

Figure 5:
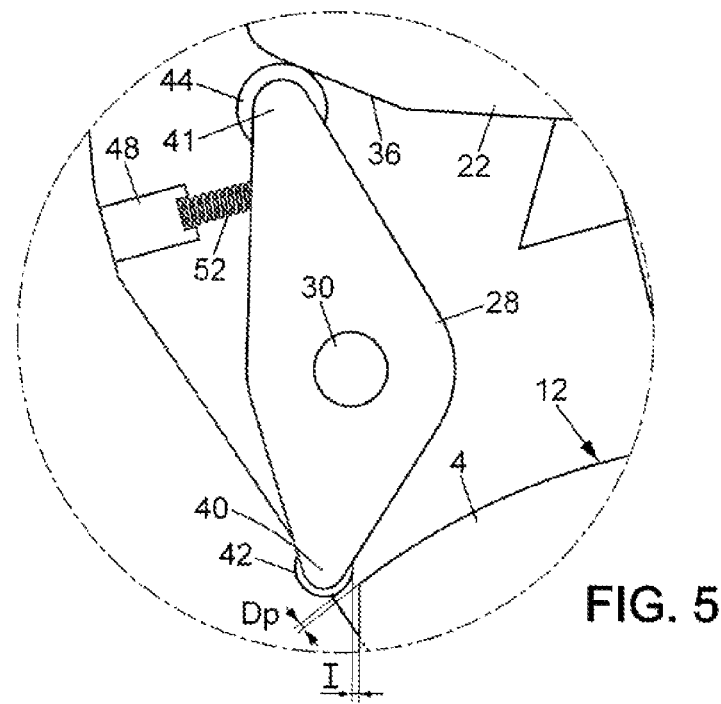
FIG. 5 is an enlargement of part of FIG. 4.

Note that even in this position of blocking the thrust reverser lever 22, the first end 40 of the locking lever is arranged at right angles to and at an interval Dp from the primary cam track 12, shown in FIG. 5. This interval Dp provides a working clearance for the thrust reverser lever 22. In other words, because of this interval Dp the thrust reverser lever 22 can be actuated over a small angle before it is blocked by contact of the first roller 42 against the primary cam track 12. This interval Dp allows the entire mechanism to move with no risk of obstruction. This interval Dp prevents the control device from becoming statically indeterminate. If this interval Dp is zero, it is impossible to actuate the thrust reverser lever 6. The interval Dp is sufficiently small that if the thrust reverser lever 22 is actuated while the thrust lever is engaged by an angle greater than the predetermined angle ϕ, the second roller 44 cannot reach the secondary cam track 38 and therefore greater actuation of the thrust reverser lever 22 is impossible.

This working clearance is small. In addition, this working clearance is constant over the entire path of the thrust lever 6 because the primary cam track 12 is circular and concentric to the center of rotation of the thrust lever 6.

In thrust reverser mode, if the pilot actuates the thrust reverser lever 22 while the thrust lever 6 is in the idle position, the second roller 44 first slides on the bearing face 36 and then on the secondary cam track 38. The biasing spring 52 is compressed, and the locking lever 28 pivots counterclockwise. The first end 40 draws close to the stop face 14 without abutting against it.

Referring to FIG. 8, when the thrust reverser lever 22 is positioned before the predefined angle σ, the second end 41 of the locking lever is on the bearing face 36 and the first end 40 is arranged above the stop face 14.

In this position, the thrust lever 6 can be actuated by the pilot in an actuation direction Fi. Upon actuation of the thrust lever 6, the locking lever 28 is rotated about the hinge axis 8 by the thrust lever 6, without pivoting about the pivot axis 30. Then, the first end 40 of the locking lever abuts against the stop face 14. The stopping of the first roller 42 40 induces, by rebound, a clockwise rotation of the locking lever 28, leading the second roller 44 to exert force on the bearing face 36 of the thrust reverser lever 22, which causes a clockwise movement of said lever, returning it to its idle position P0 against its stop 26. Actuation of the thrust lever 6 is then allowed.

The thrust reverser lever 22 is nominally pressed against its stop 26 by the biasing spring 52, as long as the actuation force Fa of the thrust reverser lever remains below a certain predetermined threshold. Beyond that, if the thrust reverser lever 22 is pivoted by an angle less than the predefined angle σ, actuation of the thrust lever 6 remains possible if the force exerted on the thrust lever 6 in an actuation direction Fi is sufficient to return the thrust reverser lever 22 towards its stop 26, to its idle position.

Referring to FIG. 9, when the thrust reverser lever 22 is positioned after the predefined angle σ, the second roller 44 is positioned on the secondary cam track 38 and the rotation of the thrust lever 6 is blocked in an actuation direction Fi, with some working clearance, by the first roller 42 of the locking lever pressing against the stop face 14 of the frame and by the second roller 44 of the locking lever pressing against the secondary cam track 38. Note that even in this blocked position of the thrust lever 6, the first roller 42 is positioned at a second distance I' from the stop face 14, allowing a small angle of rotation of the thrust lever 6. This rotation corresponds to a working clearance which is needed to avoid indeterminacy of the control device. This second distance I' is calculated as a function of the working clearance allowed by the aircraft manufacturer.

As can be seen in FIG. 9 in which the maximum driving position of the thrust reverser lever is illustrated with dotted lines, when the thrust reverser lever 22 is in the maximum driving position, the bearing face 36 abuts against the side face 262 of the stop 26.

The radius Rb of the primary cam track 12, the radius Rm of the secondary cam track 38, the length and stiffness of the biasing spring 52, and the length of interval Dp and the length of the first I and second predetermined distance, are selected as a function of the desired angle of rotation of one lever that is allowed before the other lever is locked, and the forces anticipated for manipulating each of the levers.

For example, in the example of the present invention, the predetermined angle ϕ of the actuation path of the thrust lever is equal to 2° and the predefined angle σ of the actuation path of the thrust reverser lever is equal to 25°. In FIGS. 4 to 9, the predetermined angle ϕ has been enlarged for easier understanding of the invention.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A control device for controlling power of an engine and for controlling a thrust reverser device of an aircraft, the control device comprising:
a frame,
a thrust lever for controlling the power hinged to the frame on a hinge axis,
a thrust reverser lever for controlling the thrust reverser device hinged to the thrust lever on a second hinge axis, the thrust lever and the thrust reverser lever being adapted to be pivoted from an idle position to a fully actuated position, characterized in that it further comprises:
a bearing face arranged on a portion of the thrust reverser lever,
a primary cam track provided on the frame, and
a locking lever pressing on the primary cam track comprising a pivot axis hinged on the thrust lever, a first end and a second end arranged on either side of the pivot axis,
and in that, when the thrust lever has been pivoted by an angle greater than or equal to a predetermined angle defined relative to its idle position, actuation of the thrust reverser lever is blocked, both by the second end of the locking lever pressing against the bearing face of the thrust reverser lever and by the first end of the locking lever pressing against the primary cam track.

2. The control device according to claim 1, comprising: a stop face provided on the frame, said stop face extending as an extension of the primary cam track, and a secondary cam track formed on a portion of the thrust reverser lever and extending as an extension of the bearing face; said secondary cam track forming a defined angle with the bearing face of the thrust reverser lever; said defined angle being defined in a plane perpendicular to the second hinge axis of the thrust reverser lever.

3. The control device according to claim 2, wherein when the thrust lever is positioned before said predetermined angle, the first end of the locking lever is arranged facing at a first predetermined distance from the stop face to enable actuation of the thrust reverser lever by pivoting the locking lever counterclockwise; the second end of the locking lever sliding on the bearing face to return the thrust lever to its idle position before reaching the secondary cam track.

4. The control device according to claim 2, wherein, when the thrust reverser lever has been pivoted by an angle greater than or equal to a predefined angle defined relative to its idle position, actuation of the thrust lever is blocked by the first end of the locking lever pressing against the stop face of the frame and by the second end of the locking lever pressing against the secondary cam track.

5. The control device according to claim 4, wherein said defined angle is chosen so that when the thrust reverser lever is positioned before said predefined angle, the second end is arranged on the bearing face and actuation of the thrust lever pivots the thrust reverser lever clockwise toward its idle position.

6. The control device according to claim 2, wherein the bearing face has an end connected to the secondary cam track and an opposite end, the second hinge axis of the thrust reverser lever being positioned at a distance from the bearing face of the thrust reverser lever; and wherein said distance increases between said opposite end and the end connected to the secondary cam track.

7. The control device according to claim 2, wherein the secondary cam track has a substantially rounded shape and its center is the second hinge axis of the thrust reverser lever, such that the force required to drive the thrust reverser lever is substantially constant.

8. The control device according to claim 2, wherein the defined angle is between 91° and 179°.

9. The control device according to claim 2, wherein the primary cam track forms an angle with the stop face of the frame in a plane perpendicular to the hinge axis of the thrust lever; said angle being between 91° and 179°.

10. The control device according to claim 1, which comprises:
a stop fixed to the thrust lever; the thrust reverser lever resting on an upper face of said stop when the thrust reverser lever is in the idle position;
a biasing device adapted to generate torque on the thrust reverser lever in order to return the thrust reverser lever toward said stop.

11. The control device according to claim 10, wherein the biasing device comprises a projection fixed to the thrust lever and a biasing spring fixed to said projection.

12. The control device according to claim 10, wherein the stop comprises a side face against which the thrust reverser lever is adapted to abut when the thrust reverser lever is in the fully actuated position.

13. The control device according to claim 1, wherein the first end and/or the second end of the locking lever comprise respective a first roller and/or a second roller pivotally mounted on an axis parallel to said second hinge axis.

14. The control device according to claim 1, comprising a controlling thumbwheel adapted to rotate about the hinge axis of the thrust lever in a predetermined direction in order to control the engine power and wherein the thrust lever directly drives said controlling thumbwheel.

15. The control device according to claim 14, comprising a connecting rod connecting the thrust reverser lever to said controlling thumbwheel and wherein the thrust reverser lever causes rotation, via the connecting rod, of the controlling thumbwheel in a direction that is reverse of the predetermined direction, in order to control the thrust reverser device of the aircraft.

16. The control device according to claim 1, wherein the primary cam track has a substantially rounded shape and its center is center of rotation of the thrust lever, so as to maintain a constant working clearance between the primary cam track and the first end of the locking lever, upon actuation of the thrust lever.

* * * * *